United States Patent
Stefan et al.

(10) Patent No.: US 10,479,273 B2
(45) Date of Patent: Nov. 19, 2019

(54) METHOD FOR PREVENTING OR REDUCING COLLISION DAMAGE TO A PARKED VEHICLE

(71) Applicant: Ford Global Technologies, LLC, Dearborn, MI (US)

(72) Inventors: Frederic Stefan, Aachen (DE); Uwe Gussen, Huertgenwald (DE); Christoph Arndt, Rheinland-Pfalz (DE); Goetz-Philipp Wegner, NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 523 days.

(21) Appl. No.: 14/154,787

(22) Filed: Jan. 14, 2014

(65) Prior Publication Data

US 2014/0197939 A1 Jul. 17, 2014

(30) Foreign Application Priority Data

Jan. 15, 2013 (DE) .......................... 10 2013 200 491

(51) Int. Cl.
 *B60Q 9/00* (2006.01)
 *G08G 1/16* (2006.01)
 (Continued)

(52) U.S. Cl.
 CPC ............. *B60Q 9/008* (2013.01); *B60W 30/09* (2013.01); *B60W 30/0956* (2013.01);
 (Continued)

(58) Field of Classification Search
 CPC ..................................................... B60Q 1/525
 See application file for complete search history.

(56) References Cited

U.S. PATENT DOCUMENTS 6,885,312 B1  4/2005  Kirkpatrick
8,169,341 B2  5/2012  Toledo et al.
(Continued)

FOREIGN PATENT DOCUMENTS

DE  102004037733 A1  3/2006
DE  102007021405 A1  1/2008
(Continued)

OTHER PUBLICATIONS

European Patent Office, Extended European Search Report for the corresponding European Patent Application No. 14150895.2 dated Jun. 5, 2014.
(Continued)

*Primary Examiner* — Daniell L Negron
(74) *Attorney, Agent, or Firm* — Frank MacKenzie; Brooks Kushman P.C.

(57) ABSTRACT

A method for avoiding or reducing damage to a parked vehicle caused by a collision with an approaching vehicle performing a parking operation included determining, by the parked vehicle, a risk of collision, transmitting a warning signal if the risk of collision is sufficiently high, monitoring whether the approaching vehicle reacts to the warning signal, and performing a maneuver by the parked vehicle to avoid or reduce collision damage if there is no reaction. The maneuver may permit a controlled contact between the parked vehicle and the approaching vehicle to minimize the force of the contact. After such a controlled contact, a braking torque exerted by the parked vehicle is increased. Following completion of the damage avoidance maneuver, an estimate of the extent of the completed damage prevention is made and provided to the owner of the parked vehicle (including information about potential saved repair costs).

15 Claims, 5 Drawing Sheets

(51) Int. Cl.
*B60W 30/09* (2012.01)
*B60W 30/095* (2012.01)

(52) U.S. Cl.
CPC .............. *G08G 1/165* (2013.01); *G08G 1/168* (2013.01); *B60W 2550/40* (2013.01)

(56) References Cited

U.S. PATENT DOCUMENTS

| | | | |
|---|---|---|---|
| 8,300,889 | B2 | 10/2012 | Jung |
| 8,618,955 | B2 | 12/2013 | Baker |
| 2006/0187009 | A1* | 8/2006 | Kropinski .............. B60Q 5/006 340/435 |
| 2007/0282489 | A1* | 12/2007 | Boss ................. B62D 15/0285 701/2 |
| 2009/0146841 | A1* | 6/2009 | Basson ................. G08G 1/005 340/925 |
| 2010/0030474 | A1* | 2/2010 | Sawada ................. G08G 1/163 701/301 |
| 2010/0049375 | A1* | 2/2010 | Tanimoto .................. B60T 7/12 701/1 |
| 2012/0286974 | A1 | 11/2012 | Claussen et al. |
| 2012/0300078 | A1* | 11/2012 | Ogata .................... G08G 1/166 348/148 |

FOREIGN PATENT DOCUMENTS

| | | |
|---|---|---|
| DE | 102009032444 A1 | 3/2010 |
| DE | 102010001264 A1 | 7/2011 |
| EP | 1408455 A3 | 2/2006 |

OTHER PUBLICATIONS

European Patent Office, Extended European Search Report for the corresponding European Patent Application No. 15178302.4 dated Oct. 19, 2015.

* cited by examiner

Fig. 3
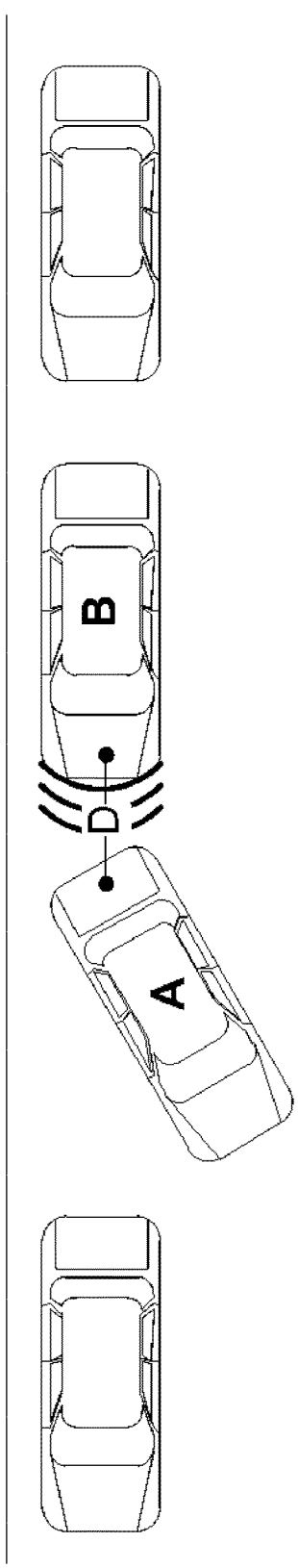
a)
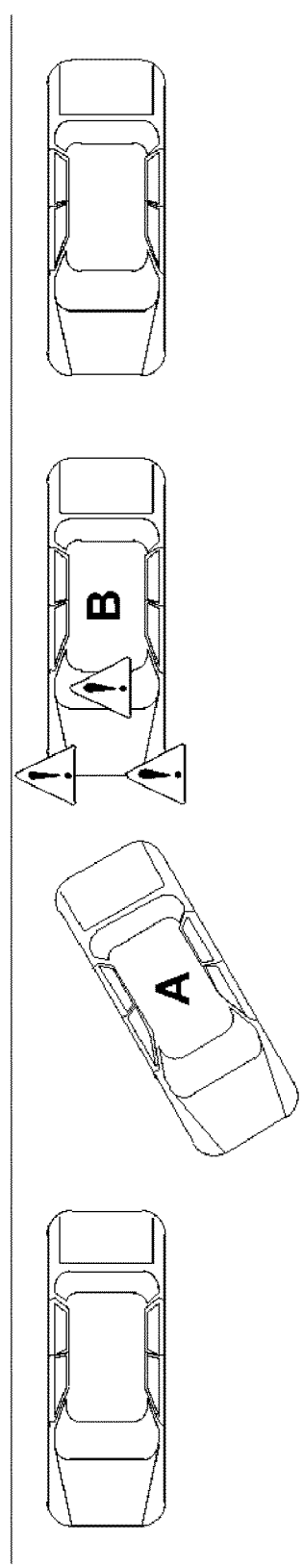
b)

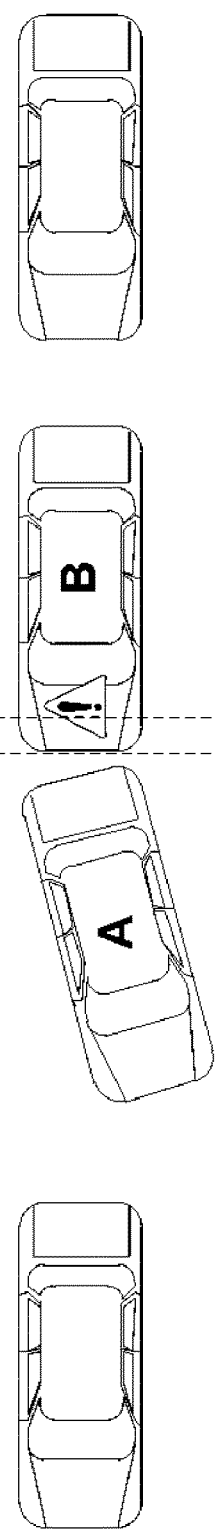
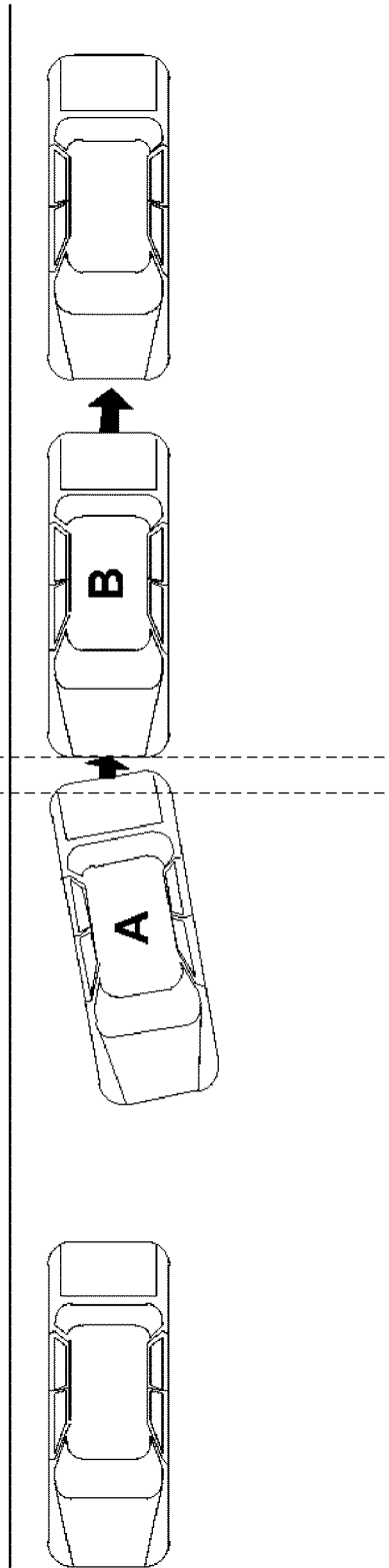
Fig. 4

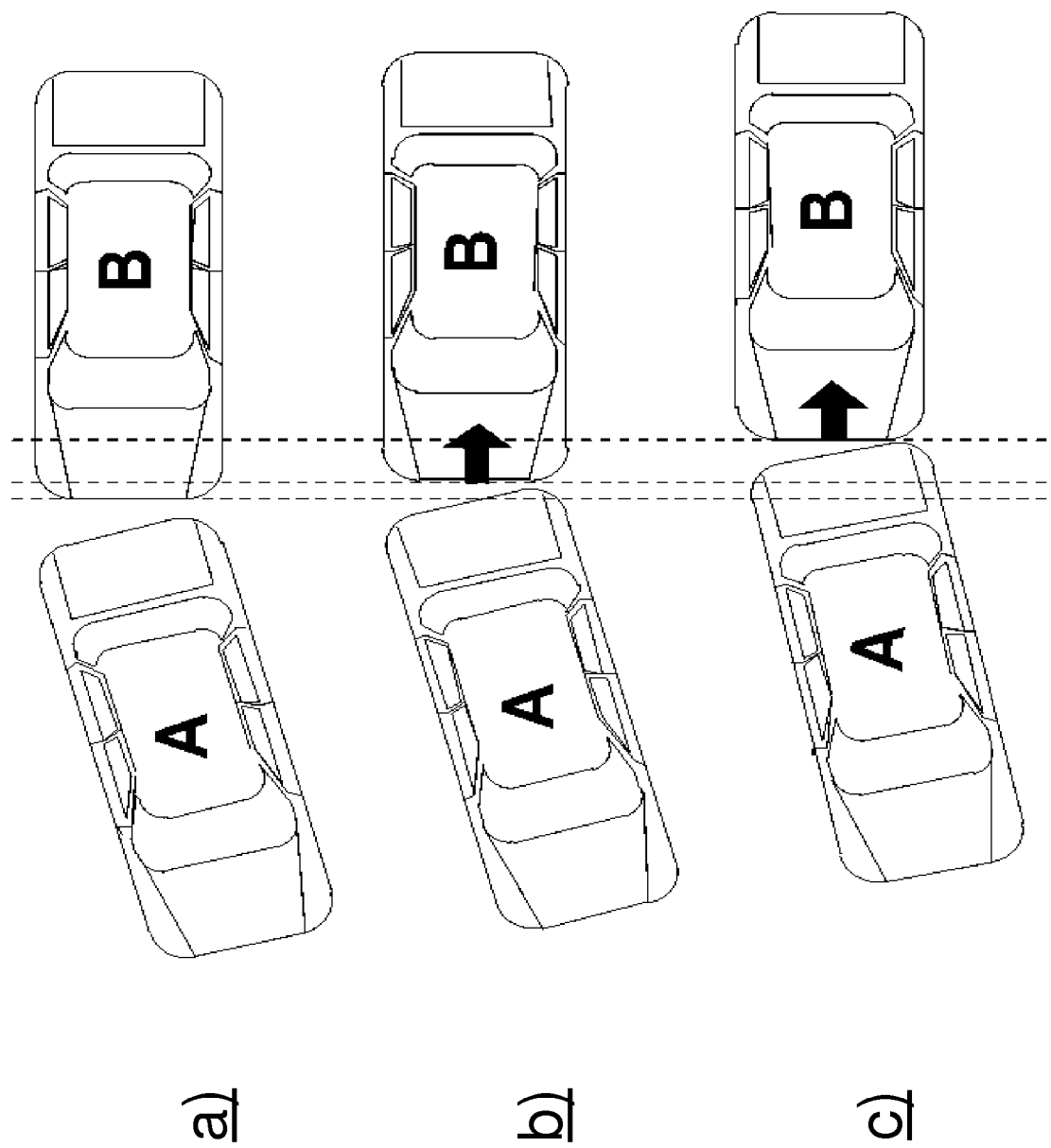

METHOD FOR PREVENTING OR REDUCING COLLISION DAMAGE TO A PARKED VEHICLE

CROSS-REFERENCE TO RELATED APPLICATIONS

This application claims foreign priority benefits under 35 U.S.C. 119(a)-(d) to DE 10 2013 200 491.5 filed on Jan. 15, 2013, which is hereby incorporated by reference in its entirety.

TECHNICAL FIELD

The invention relates to a method for avoiding or preventing collision damage to a parked vehicle caused by a collision with a vehicle performing a parking operation.

BACKGROUND

The parking of vehicles can for different reasons cause damage to already parked vehicles, which is associated with stress burdens and additional costs for vehicle occupants and insurance.

A method and a device for operating a motor vehicle and a system for arranging standing positions of at least two motor vehicles are known from DE 10 2009 057647 A1. Here one of the motor vehicles comprises an interface that is designed for communications with another motor vehicle having a corresponding further interface. In addition, a unit for autonomous maneuvering of the motor vehicle is provided in the respective motor vehicle. Here a response to a vehicle to be parked may take place, especially by means of communications between the vehicle to be parked and a parked vehicle, that the space available for parking is not adequate for the parking operation. Furthermore, in the event of there being adequate space for the parking operation, sequential maneuvering of the parked vehicle takes place.

Furthermore, parking assistance systems are known, e.g. from DE 10 2009 008 113 A1, DE 10 2010 037 295 A1 and DE 10 2011 011 144 A1.

SUMMARY

In a disclosed embodiment, a method for avoiding or reducing the extent of collision damage to a parked vehicle comprises two stages: If a risk of collision with an approaching vehicle performing a parking operation is detected, in a first stage a warning is given by the parked vehicle to the driver of the approaching vehicle, which can e.g. be carried out with audible signals or light signals. If a collision is imminent because the approaching vehicle or its driver does not react to the warning signal, in a second stage the parked vehicle performs a suitable maneuver for avoiding or reducing collision damage (whereby it is automatically moved slightly) in order to prevent damage because of the parking operation.

As a result, damage occurring to parked vehicles can be prevented or at least reduced. Here it is only necessary to equip the parked vehicle with the device according to the invention (or to carry out the corresponding process steps only on the part of the parked vehicle), so that no data exchange or communications between the respective already parked vehicle and the vehicle to be parked is necessary. Collision damage to a parked vehicle as a result of an approaching vehicle performing a parking operation is reliably prevented or at least the extent of damage is reduced at comparatively low cost and without the need for a complex data exchange between different vehicles.

The disclosed method can be implemented using already existing technologies and sensors. In particular, already existing systems for collision avoidance, driver assistance systems and devices for automatic parking support can be suitably extended to implement the invention.

According to one embodiment, the damage avoidance/reduction maneuver is carried out such that the distance between the parked vehicle and the approaching vehicle is not less than a minimum distance.

According to another embodiment, the damage avoidance/reduction is carried out such that a contact between the parked vehicle and the approaching vehicle is allowed to a controlled degree and in a controlled manner to minimize the force of the contact. This is especially advantageous if the available space for the damage avoidance/reduction maneuver to be performed by the parked vehicle is otherwise insufficient (i.e. without such a typically transient contact).

According to one embodiment, after the occurrence of the controlled contact between the parked vehicle and the approaching vehicle a braking torque exerted by the parked vehicle is increased. The attention of the driver performing the parking operation can thereby be additionally awakened.

According to one embodiment, transmitting the warning signal is continued until the damage avoidance/reduction maneuver to be carried out by the parked vehicle is completed. In this way the attempt to stimulate the attention of the driver performing the parking operation can also be continued.

According to one embodiment, one or more characteristics of the transmitted warning signal can be varied depending on an existing probability of a collision and/or depending on the extent of the collision damage to be expected.

According to one embodiment, following completion of the collision-avoidance/damage-reduction maneuver carried out by the parked vehicle, an estimate of the extent of the completed damage prevention takes place so that the owner of the parked vehicle can be provided with corresponding information (especially including information about potential saved repair costs).

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

FIGS. 2-5 show schematic illustrations for illustrating different embodiments of the method disclosed herein.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
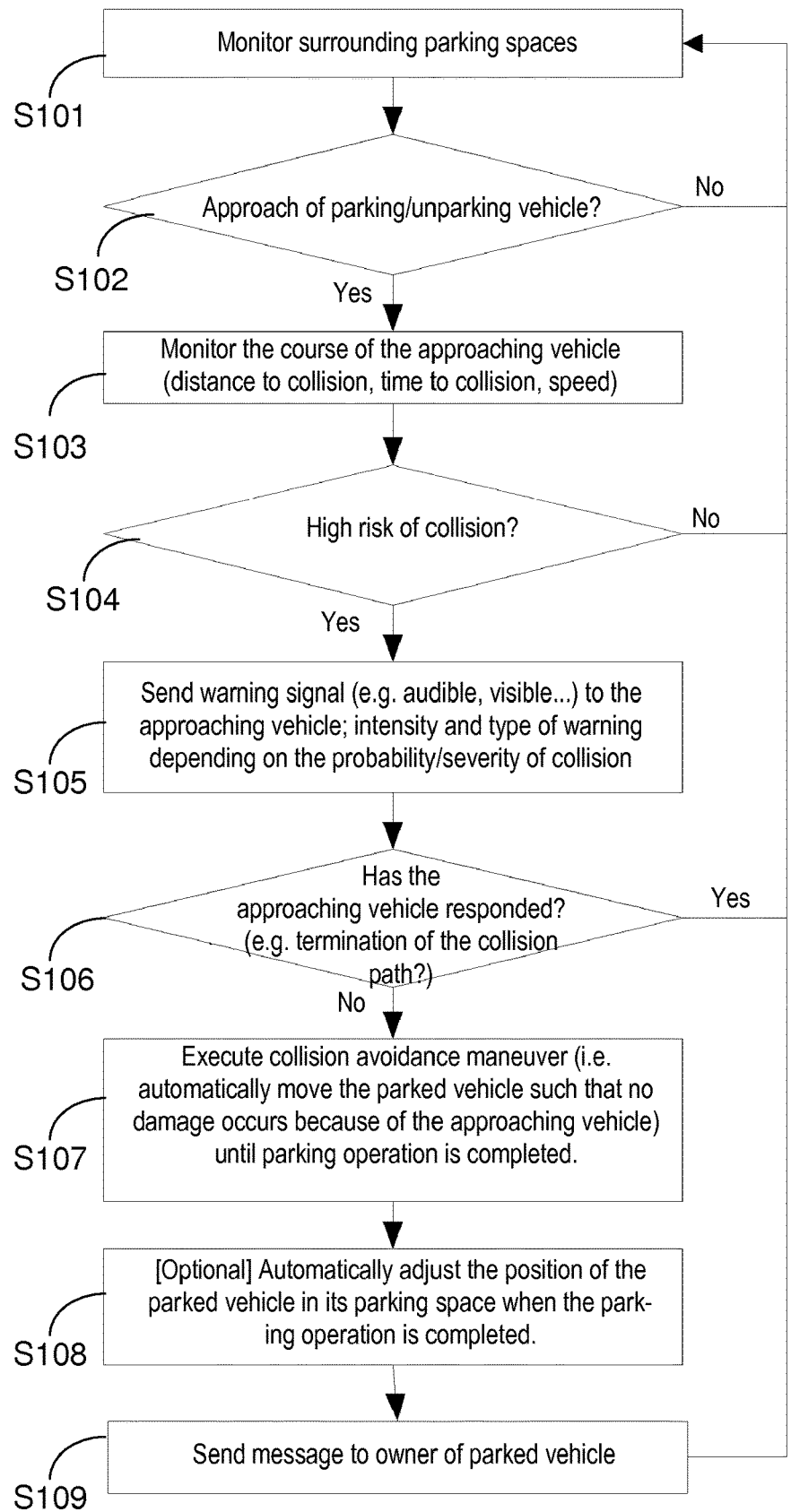
FIG. 1 shows a flow diagram for explaining the process of a method according to the invention in one embodiment.
Figure 2:
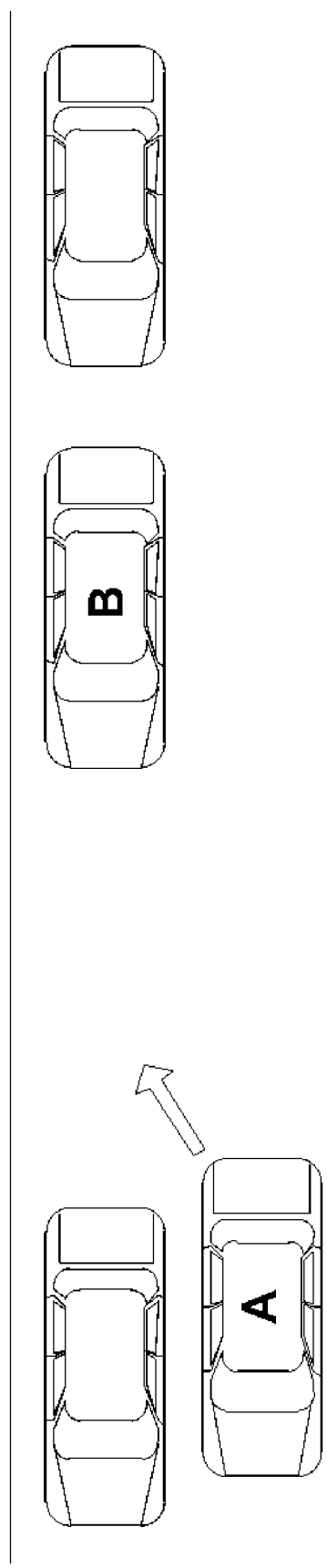

According to FIG. 1, in a step S101 a parked vehicle, which is referred to in FIGS. 2-5 as "B", monitors the surrounding parking spaces if the corresponding function has been activated by the driver and once the driver has left the vehicle B involved.

In step S102 the parked vehicle B determines, using on-board sensors (such as those already present on the vehicle and as used in systems for collision avoidance, driver assistance systems and devices for automatic parking support), whether another approaching vehicle, which is referred to in FIGS. 2-5 as "A", is performing a parking operation towards an adjacent parking space (i.e. one located immediately before or behind the parked vehicle B).

If this is the case according to the query in step S102, said parking operation of the vehicle A is monitored by the parked vehicle B in step S103. If it is determined on the part of the parked vehicle B that approaching vehicle A is on a "collision course" (e.g. there is an increased risk of an impending collision because of the speed of the vehicle, the distance until a contact and/or the time until a contact), the parked vehicle B sends warning signals (e.g. visible or audible signals) to the driver of the approaching vehicle A. The nature of the warning signal may vary, e.g. the horn of the parked vehicle B can be activated with a specified rhythm, the lamps of the parked vehicle B can be activated with a specified frequency, the windscreen washer nozzles of the parked vehicle B can spray water onto the rear screen of the approaching vehicle A, etc.

The warning signals sent to the approaching vehicle A or its driver can have different characteristics depending on the probability and/or the extent of the potential collision. Here an estimate of possible damage (destruction of vehicle lights, dents, scratches etc.) can take place. Furthermore, the dimensions of the approaching vehicle A (weight, shape etc.) can also be taken into account, which can e.g. be determined with a camera on-board the vehicle B. Moreover, the warning signal sent to the approaching vehicle A or its driver can be more intense for a greater probability of a collision and/or for more costly expected damage.

The previously described steps are illustrated in FIGS. 3*a-b*. Here, according to FIG. 3*a* a high probability of a collision is detected by the parked vehicle B, wherein e.g. the speed of the approaching vehicle A exceeds a predefined limit value and the distance D is below a predefined limit value. According to FIG. 3*b* parked vehicle B sends special warning signals in order to make the driver of the approaching vehicle A suitably aware (step S105 in FIG. 1).

Again referring to FIG. 1, if according to the query in step S106 approaching vehicle A reacts to the warning signals of the parked vehicle B (e.g. if the approaching vehicle A is stopped), the method returns to step S101.

If on the other hand according to the query in step S106 approaching vehicle A does not react to the warning signals of the parked vehicle B, in step S107 a process for collision avoidance and/or damage reduction is started. This takes place especially if the collision or damage is imminent, and is carried out until the approaching vehicle A has completed its parking operation. The warning signals sent in step S105 are preferably continued during step S107 until the process for collision avoidance is completed.

Furthermore, exemplary strategies started in step S107 for collision avoidance are described with reference to FIGS. 4*a-b* and 5*a-c*.

In a first strategy for collision avoidance, with reference to FIGS. 4*a-b* for the case that there is sufficient space around the parked vehicle B, a small movement of the parked vehicle B takes place forwards or rearwards if a collision is imminent, wherein a minimum distance is maintained to the approaching vehicle A or the distance to the approaching vehicle A does not fall below the minimum distance. In specific cases, according to FIG. 4*b* a rearwards movement of the parked vehicle B takes place, wherein any contact with the approaching vehicle A is avoided.

Another strategy for a damage avoidance/reduction maneuver is illustrated in FIGS. 5*a-c*. If there is not sufficient space around the parked vehicle B, only a very small movement of the parked vehicle B takes place away from the approaching vehicle A, wherein according to FIG. 5*b* a gentle contact is allowed between the approaching vehicle A and the parked vehicle B. Said safe and controlled "contact" is hereby optimized such that any damage during the collision is headed off or at least reduced by the maneuver. Once the contact has taken place the parked vehicle B preferably increases its braking torque, whereby additional rearwards movement of the vehicle A is inhibited in order to draw the attention of the driver of the approaching vehicle A to it, as indicated in FIG. 5*c*.

Again referring to FIG. 1, in step S108 an automatic re-adjustment of the position of the parked vehicle B can optionally take place, depending upon and as allowed by the final position of the approaching vehicle A.

If the previously described maneuver for avoiding parking collisions and damage has completed, a communication device on-board the parked vehicle B sends in step S109 in the described exemplary embodiment a suitable message to the owner of the parked vehicle B or to an optional suitable information network. Hereby statistical information about the prevented damage can be estimated and transmitted (e.g. about how great was the saving for the owner of the parked vehicle B because of the damage prevented, how often the system was activated etc.).

As a result, collision damage to a parked vehicle as a result of a vehicle performing a parking operation is reliably prevented or at least alleviated by the invention with comparatively low costs and especially without the need for a complex data exchange between different vehicles.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for reducing a likelihood and/or severity of damage to a parked vehicle caused by a collision with an approaching vehicle performing a parking operation, comprising:

by the parked vehicle,
  operating a system on-board the parked vehicle to detect the approaching vehicle;
  determining a risk of collision between the parked vehicle and the approaching vehicle;
  transmitting at least one of an off-board audible and an off-board visible warning signal perceptible to a driver of the approaching vehicle if the risk of collision is sufficiently high;

operating the system to monitor whether the approaching vehicle reacts to the warning signal;

if the approaching vehicle does not react to the warning signal, moving the parked vehicle away from the approaching vehicle to prevent a distance between the parked vehicle and the approaching vehicle from falling below a minimum distance; and after completion of the maneuver, estimating an extent of damage avoided by the movement of the parked vehicle.

2. The method of claim 1, wherein transmission of the warning continues until the movement of the parked vehicle is complete.

3. The method of claim 1, wherein a characteristic of the warning signal is determined based upon on an estimated probability of a collision and/or upon an expected extent of collision damage.

4. The method of claim 1, wherein the risk of collision is defined by a speed of the approaching vehicle exceeding a predefined speed limit.

5. The method of claim 1, wherein the risk of collision is defined by a distance between the approaching and parked vehicles falling below a predefined distance limit.

6. A method for collision avoidance by a parked vehicle, comprising:

by the parked vehicle, responsive to a detected risk of collision with an approaching vehicle, transmit an off-board warning perceptible to a driver of the approaching vehicle;

responsive to no reaction to the warning by the approaching vehicle, maneuver the parked vehicle such that a distance between the parked vehicle and the approaching vehicle does not fall below a minimum distance; and after completion of the maneuver, estimating an extent of damage avoided by performing the maneuver.

7. The method of claim 6, wherein transmission of the warning continues until the maneuver is completed.

8. The method of claim 6, wherein a characteristic of the warning signal is determined based upon on an estimated probability of a collision and/or upon an expected extent of collision damage.

9. The method of claim 6, wherein the detected risk of collision is defined by a speed of the approaching vehicle exceeding a predefined speed limit.

10. The method of claim 6, wherein the detected risk of collision is defined by a distance between the approaching and parked vehicles falling below a predefined distance limit.

11. The method of claim 6, wherein the detected risk of collision is defined by a speed of the approaching vehicle exceeding a predefined speed limit.

12. A method for collision avoidance by a parked vehicle, comprising:

by the parked vehicle, responsive to a detected risk of collision with an approaching vehicle, transmit an off-board warning perceptible to a driver of the approaching vehicle;

responsive to no reaction to the warning by the approaching vehicle, maneuver the parked vehicle to avoid collision; and after completion of the maneuver, estimating an extent of damage avoided by performing the maneuver.

13. The method of claim 12, wherein transmission of the warning continues until the maneuver is completed.

14. The method of claim 12, wherein a characteristic of the warning signal is determined based upon on an estimated probability of a collision and/or upon an expected extent of collision damage.

15. The method of claim 12, wherein the detected risk of collision is defined by a distance between the approaching and parked vehicles falling below a predefined distance limit.

\* \* \* \* \*